United States Patent
Jeon

(10) Patent No.: US 8,225,364 B2
(45) Date of Patent: Jul. 17, 2012

(54) METHOD OF SEARCHING INTERNET AND VIDEO RECEIVING APPARATUS TO USE THE SAME

(75) Inventor: Jin-a Jeon, Seoul (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 1420 days.

(21) Appl. No.: 11/769,029

(22) Filed: Jun. 27, 2007

(65) Prior Publication Data
US 2008/0168514 A1    Jul. 10, 2008

(30) Foreign Application Priority Data
Jan. 4, 2007  (KR) .................. 10-2007-0000919

(51) Int. Cl.
*H04N 7/173* (2006.01)
(52) U.S. Cl. ........................... 725/110; 348/114
(58) Field of Classification Search ................ None
See application file for complete search history.

(56) References Cited

U.S. PATENT DOCUMENTS
7,831,992 B2 * 11/2010 Stone .......................... 725/112

FOREIGN PATENT DOCUMENTS
JP    2001157284 A  *  6/2001
* cited by examiner

*Primary Examiner* — Scott Beliveau
*Assistant Examiner* — Yassin Alata
(74) *Attorney, Agent, or Firm* — Stanzione & Kim, LLP

(57) ABSTRACT

A method of searching the Internet and a video receiving apparatus, such as an Internet TV, to use the same to enable currently-displayed video to be transmitted to an external apparatus, such as a remote controller, and the video received from the external apparatus to be controlled, thereby increasing user convenience. Specifically, the video captured from the video receiving apparatus is transmitted to the external apparatus which receives coordinate data and performs an operation indicated by a menu of the currently-displayed video corresponding to the coordinate data received from the external apparatus so that websites having menus requiring user control can be used without requiring redesign even if the websites are not designed for use with the video receiving apparatus.

16 Claims, 5 Drawing Sheets

METHOD OF SEARCHING INTERNET AND VIDEO RECEIVING APPARATUS TO USE THE SAME

CROSS-REFERENCE TO RELATED APPLICATIONS

This application claims priority under 35 U.S.C. §119(a) from Korean Patent Application No. 2007-919 filed Jan. 4, 2007, in the Korean Intellectual Property Office, the disclosure of which is incorporated herein by reference in its entirety.

BACKGROUND OF THE INVENTION

1. Field of the Invention

The present general inventive concept relates to a method of searching the Internet and a video receiving apparatus to use the same. More particularly, the present general inventive concept relates to a method of searching the Internet and a video receiving apparatus to use the same, which enable a user to conveniently use content provided on the Internet.

2. Description of the Related Art

Video receiving apparatuses display video corresponding to broadcast signals received via antennas, and typically used with TVs. Recent innovations enable video receiving apparatuses to provide an Internet search function. Video receiving apparatuses including the Internet search function are referred to as "Internet TVs."

Internet TVs may access an Internet service providing server directly through a Local Area Network (LAN) without being connected to separate additional devices, such as conversational compact disc (CD) players for the Internet, thus enabling a user to use the Internet.

FIG. 1 is a view illustrating a conventional Internet TV 10 that enables the user to search the Internet using a remote controller 50. The remote controller 50 is provided with buttons similar to existing remote controllers.

Specifically, the Internet TV 10 provides the user with content provided from various content service providers by accessing a content providing server. The user may use the remote controller 50 in order to select specific content from among a range of different types of content.

The Internet TV 10 may typically be used with Internet-TV websites, which include existing websites that have been redesigned to accommodate Internet-TVs or special websites that have been specifically designed for Internet TVs. Generally, Internet-TV websites are designed to provide easy navigation therethrough via the Internet TV 10 so that the user may easily access specific content by manipulating the remote controller 50, which has limited control capability relative to convention controller devices that allow the user to freely select content on the website using a mouse and a keyboard.

Therefore, the conventional Internet TV is limited to specific content provided on Internet-TV websites, which are designed for use with the Internet TV while other non-Internet TV websites are not capable of being easily used with the Internet TV. If a user desires to use a non-Internet TV website with the conventional Internet TV, navigation therethrough requires considerable time and resources.

SUMMARY OF THE INVENTION

The present general inventive concept provides a method of searching the Internet and a video receiving apparatus to use the same, in which non-Internet TV websites can be used without being redesigned to accommodate Internet TVs.

The present general inventive concept also provides a method of searching the Internet and a video receiving apparatus to use the same, which provides a remote controller to enable a user to freely select content provided from the non-Internet TV websites so that the user can navigate through non-Internet TV websites and conveniently select and use content thereof by using the remote controller.

Additional aspects and/or utilities of the present general inventive concept will be set forth in part in the description which follows and, in part, will be obvious from the description, or may be learned by practice of the general inventive concept.

Additional aspects and/or utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing a method of searching the Internet, the method including capturing a currently-displayed video and transmitting the captured video to a remote controller by a main body, displaying the received video and transmitting coordinate data representing a position on a screen of the displayed video touched by a user to the main body by the remote controller, and performing an operation indicated by a menu at the position representing the received coordinate data in the video currently being displayed by the main body.

The capturing may include capturing the currently-displayed video if it is determined that the currently-displayed video is video requiring a user selection.

The capturing may include determining that the currently-displayed video is Internet video if the currently-displayed video is the same as previously-displayed video.

The capturing may include adjusting the video currently being displayed according to a resolution of the remote controller.

The transmitting the coordinate data may include replacing the coordinate data representing the touched position with coordinate data representing a screen of the main body.

The transmitting the coordinate data may include computing the coordinate data representing the screen of the main body using the coordinate data representing the touched position main body resolution information contained in head information of the captured video to be transmitted to the remote controller and the resolution of the remote controller.

The foregoing and/or other aspects and utilities of the present general inventive concept may be also achieved by providing a video receiving apparatus including a main body to capture currently-displayed video, to transmit the captured video, and to perform an operation indicated by a menu at a position representing the received coordinate data in the currently-displayed video, a display part, and a remote controller to display the captured currently-displayed video received from the main body on the display part, and to transmit coordinate data representing a position on a screen of the displayed video touched by a user to the main body.

The main body may include a screen capturer to capture the currently-displayed video, and a controller to control the screen capturer to capture the currently-displayed video if it is determined that the currently-displayed video is video requiring user selections.

The controller may determine that the currently-displayed video is the video requiring the user selection if the currently-displayed video is the same as previously-displayed video.

The screen capturer may adjust the currently-displayed video according to a resolution of the remote controller.

The remote controller may include a controlling part to replace the coordinate data representing the touched position with coordinate data representing a screen of the main body.

The controlling part may compute the coordinate data representing the screen of the main body using the coordinate data representing the touched position main body resolution information contained in head information of the captured video to be transmitted to the remote controller and a resolution of the remote controller.

The foregoing and/or other aspects and utilities of the present general inventive concept may also be achieved by providing a video receiving apparatus which receives a broadcast signal and Internet information to display video corresponding to the received broadcast signal and Internet information, the apparatus including a screen capturer to capture currently-displayed video, and a controller to control the screen capturer so that the currently-displayed video is captured, to transmit the captured currently-displayed video to a remote controller, and to perform an operation indicated by a menu at a position representing coordinate data received from the remote controller in the currently-displayed video.

The foregoing and/or other aspects and utilities of the present general inventive concept may also be achieved by providing a remote controller including a transmitter-receiver to receive video captured from a video receiving apparatus and to transmit a control command to control the video receiving apparatus, a display part to display the received video, and a controlling part to display the captured video received from the video receiving apparatus on the display part, to replace coordinate data representing a touched position on a screen of the displayed video with coordinate data representing a screen of the video receiving apparatus, and to transmit the replaced coordinate data to the video receiving apparatus.

The foregoing and/or other aspects and utilities of the present general inventive concept may also be achieved by providing a display apparatus including a primary display unit to display and transmit a video, a secondary display unit to receive and display the video, a user interface to enable a user to select a first point on the video displayed by the secondary display unit, a secondary display controller to transmit the first point to the primary display unit, and a primary display controller to receive the first point from the secondary display controller and to display a second point on the primary display unit.

The display apparatus may include a first set of x and y coordinates to define the first point, and a second set of x and y coordinates to define the second point, wherein the first set of x and y coordinates and the second set of x and y coordinates are equal.

The primary display unit may be larger than the secondary display unit.

The secondary display unit may be sized to be held via a user hand and simultaneously operated via a user thumb.

The primary display controller may compare the video to a first data and a second data, determine whether the video requires a user selection, and automatically select whether to transmit the video to the secondary display unit based on whether the video requires the user selection.

If the first data is the same as the second data, the primary display controller may transmit the video to the secondary display unit.

If the first data is different than the second data, the primary display controller may not transmit the video to the secondary display unit.

The primary display unit may be a color display unit and the secondary display unit may be a color display unit.

The foregoing and/or other aspects and utilities of the present general inventive concept may also be achieved by providing a method of operating a remote controller including receiving a video from a video receiving apparatus, displaying the video received from the video receiving apparatus on a display part, receiving a first set of coordinate data representing a touched position on the display part of the displayed video, converting the first set of coordinate data to a second set of coordinate data representing a screen of the video receiving apparatus, and transmitting the second set of coordinate data to the video receiving apparatus.

The first set of coordinate data may correspond to a user selection on a menu displayed by the video on the video receiving apparatus.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

Throughout the drawings, the same drawing reference numerals will be understood to refer to the same elements, features and/or structures.

DETAILED DESCRIPTION OF THE PREFERRED EMBODIMENTS

Figure 1:
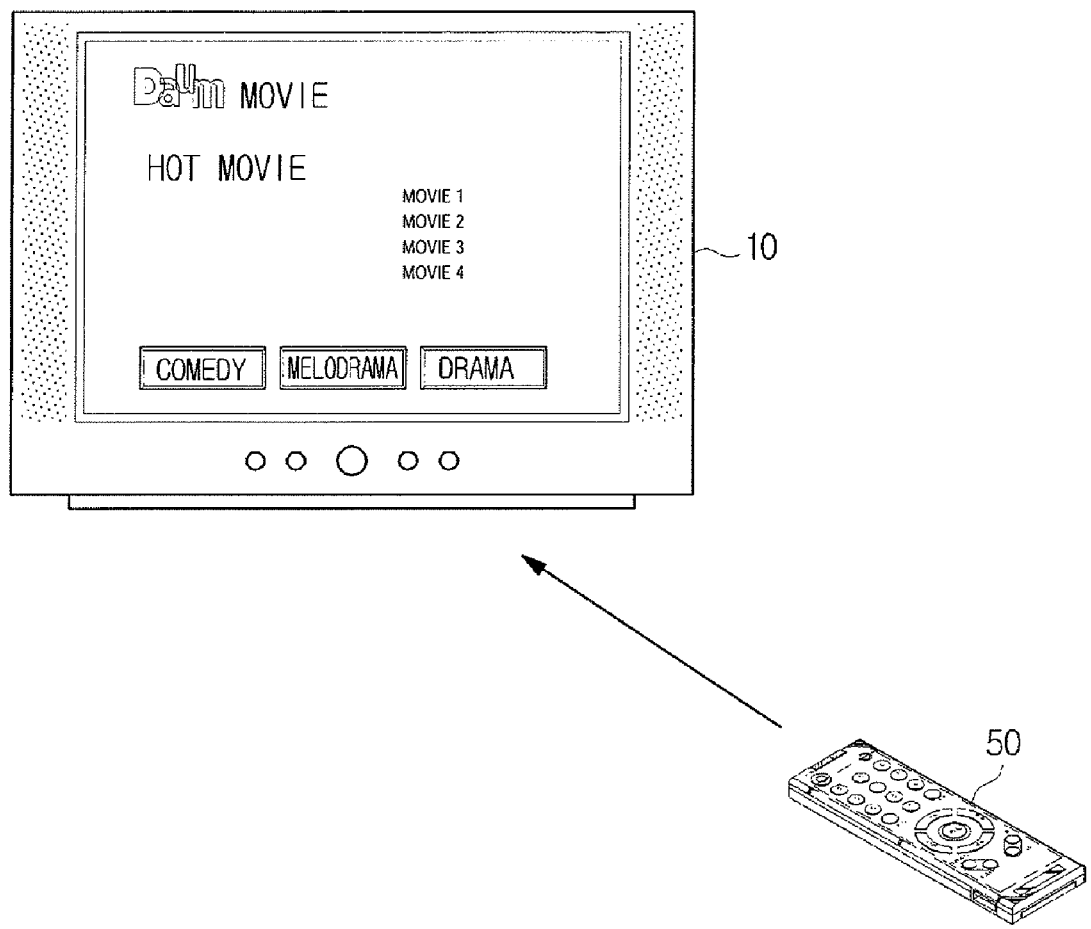
FIG. 1 is a view illustrating a conventional Internet TV.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
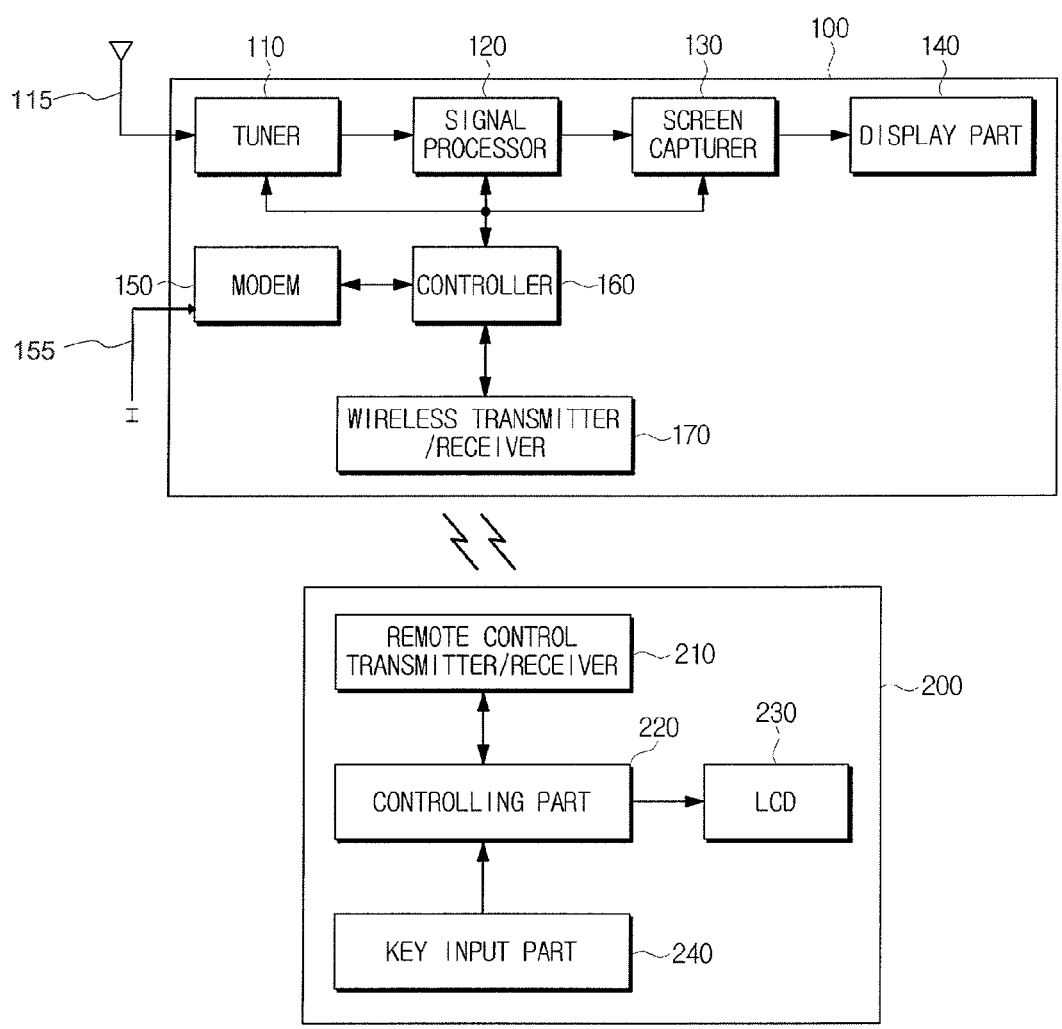
FIG. 2 is a block diagram of an Internet TV according to an exemplary embodiment of the present general inventive concept.

FIG. 2 is a block diagram of an Internet TV according to an exemplary embodiment of the present general inventive concept.

The Internet TV 100, according to an exemplary embodiment of the present general inventive concept, includes a remote controller 200, which enables a user to easily navigate websites that are not specially designed for Internet TV use (non-Internet TV websites) and freely select content provided thereon. Accordingly, the selected content is provided to the user using the remote controller 200.

In FIG. 2, the Internet TV 100 includes a main body including a tuner 110, a signal processor 120, a screen capturer 130, a display part 140, a modem 150, a controller 160, and a wireless transmitter/receiver 170. The user interacts with the Internet TV 100 via the remote controller 200.

The tuner 110 can receive a broadcast signal 115 via an antenna, satellite, or cable connection (not illustrated). The modem 150 can receive Internet information (155) from the Internet. The signal processor 120 can process the broadcast signal 115 received by the tuner 110 and/or Internet information 155 to be displayed.

The screen capturer 130 can capture video corresponding to the Internet information 155 processed by the signal processor 120. The display part 140 can display video corresponding to the broadcast signal 115 processed by the signal processor 120 or video corresponding to the Internet information 155. The modem 150 can receive the Internet information 155 from a content server.

The controller 160 can determine whether the video being displayed on the display part 140 is viewable video or video requiring user selections. If the video requires user selections, the controller 160 can control the screen capturer 130 to capture a video currently being displayed.

Additionally, the controller 160 can transmit the video captured by the screen capturer 130 to the remote controller 200 by the wireless transmitter/receiver 170. The wireless transmitter/receiver 170 can transmit the captured video to the remote controller 200 and receive an output signal from the remote controller 200.

The remote controller 200 includes a remote control transmitter/receiver 210, a controlling part 220, a liquid crystal display (LCD) 230, and a key input part 240.

The remote control transmitter/receiver 210 can receive the captured video from the wireless transmitter/receiver 170.

The controlling part 220 can display the video received by the remote control transmitter/receiver 210 on the LCD 230.

The LCD 230 may be a touch screen or other similar device to enable the user to interact with the controlling part 220. In the case that the LCD is a touch screen, upon the user touching the LCD 230, the controlling part 220 can replace coordinate data (LCD-touch Co.) representing a touched position on the LCD 230 with coordinate data (ITV Co.) representing the display part 140 of the Internet TV 100. Additionally, the controlling part 220 may transmit the replaced coordinate data to the Internet TV 100 via the remote control transmitter/receiver 210.

The key input part 240 includes several keys to input commands relating to the operation of the Internet TV 100 including, but not limited to a channel change command, an Internet access command, or other commands.

Figure 3:
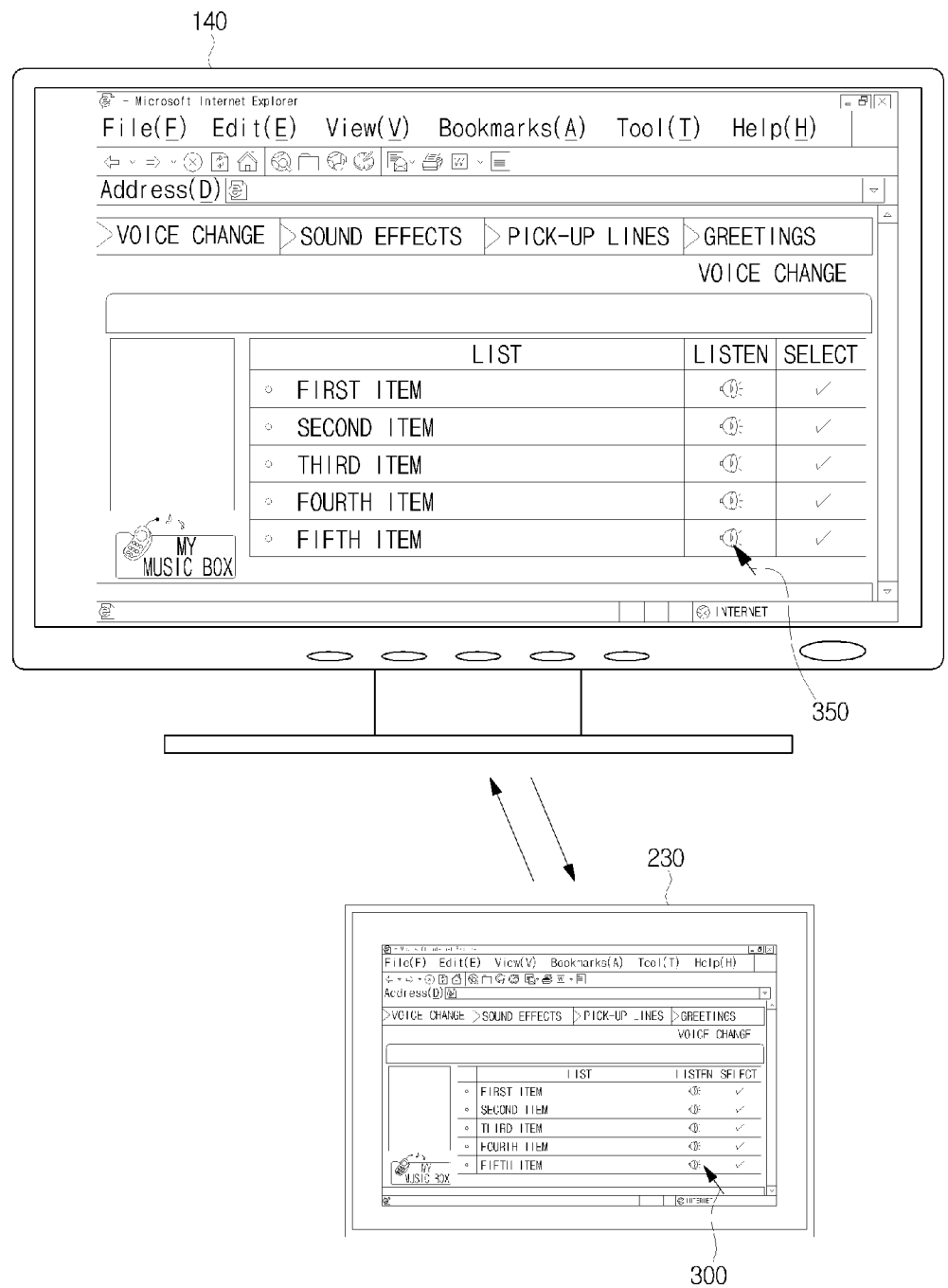
FIG. 3 is a view regarding a method of interfacing an Internet TV with a remote controller, according to an exemplary embodiment of the present general inventive concept.

FIG. 3 is a view regarding a method of interfacing the Internet TV with the remote controller, according to an exemplary embodiment of the present general inventive concept.

The controller 160 can capture the video being displayed on the display part 140 and transmit the captured video to the remote controller 200. The controlling part 220 of the remote controller 200 can then display the received video on the LCD 230.

If the LCD 230 is touched, the controlling part 220 may transfer coordinate data (LCD-touch Co.) representing a touched position 300 on the LCD 230 to the display part 140 of the Internet TV 100. The Internet TV 100 converts the coordinate data (LCD-touch Co.) to coordinate data (ITV Co.) to represent a position 350 on the display part 140 to account for differences between the Internet TV 100 and the remote controller 200 including, but not limited to resolution. As such, the position 350 corresponds to the touched position 300. The conversion of the coordinate data (LCD-touch Co.) can be converted to the coordinate data (ITV Co.) at either the Internet TV 100 or the remote controller 200.

The controller 160 can display the position 350 on the display part 140, which corresponds to the coordinate data received from the remote controller 200. In other words, the touched position 300 on the LCD 230 is mirrored by the position 350 displayed on the display part 140.

Figure 4:
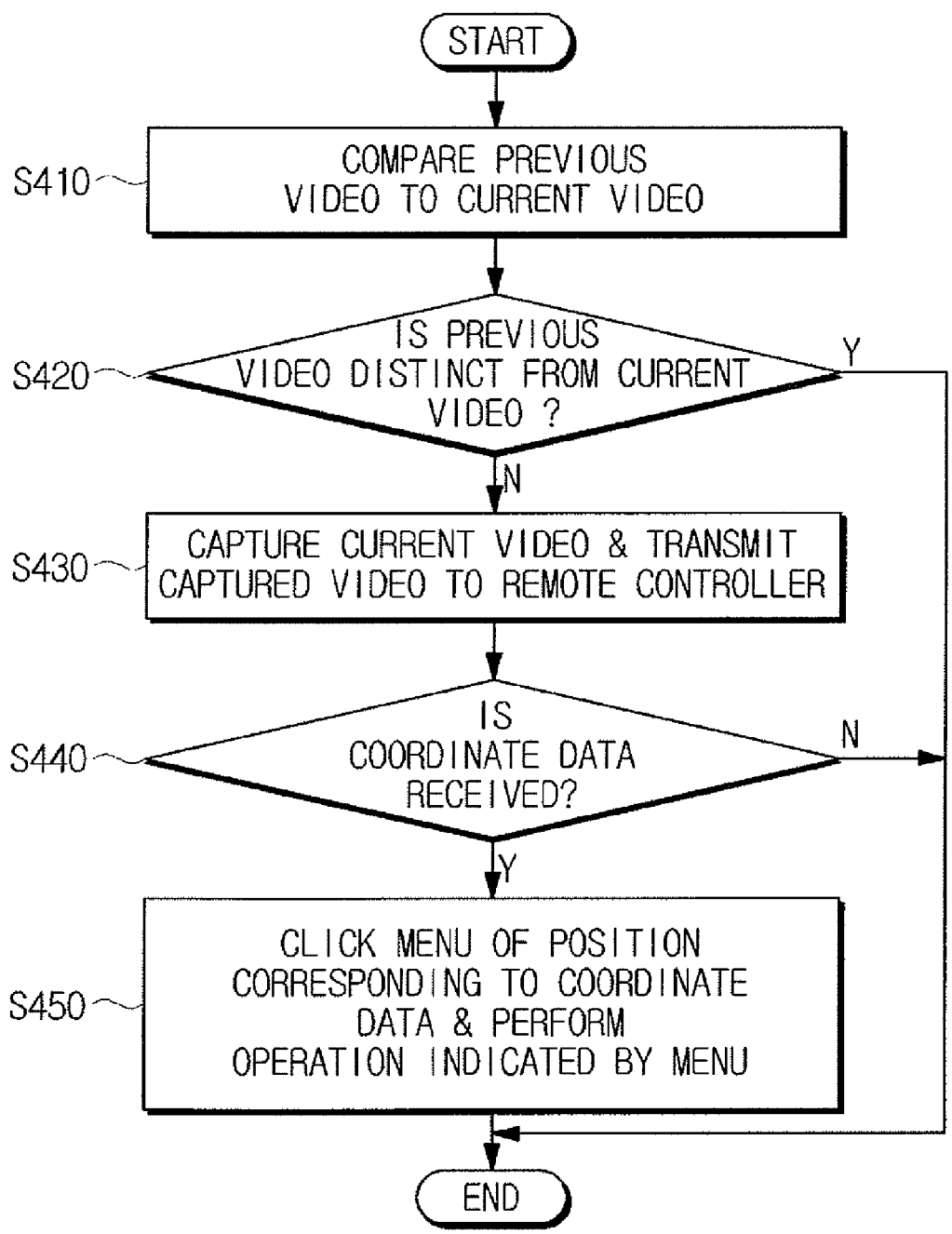
FIG. 4 is a flowchart regarding a method of searching the Internet in the Internet TV according to an exemplary embodiment of the present general inventive concept.

FIG. 4 is a flowchart illustrating a method of searching the Internet via the Internet TV according to an exemplary embodiment of the present general inventive concept.

In FIG. 4, the controller 160 of the Internet TV 100 can compare previously displayed video and currently displayed video, which are displayed on the display part 140 in operation S410 so the controller 160 can determine whether the video being displayed on the display part 140 is viewable video or video requiring user selections.

The viewable video refers to video corresponding to the broadcast signal 115 received by the tuner 110. The video requiring user selections refers to video corresponding to the Internet information 155 received through the modem 150. Since the video corresponding to the Internet information 155 includes menus to enable a user to select content on a website screen, it is referred to as video requiring user selections.

The controller 160 can determine whether the previously displayed video is different from the currently displayed video in operation S420. Specifically, if the video being displayed is the video corresponding to the broadcast signal 115, the video may change without user interaction at a rate of every 1/60 of a second, for example. Accordingly, if the previously displayed video is different from the currently displayed video, the controller 160 can determine that the video being displayed is the video corresponding to the broadcast signal 115.

On the other hand, if the video being displayed is the video corresponding to the Internet information 155, there is no change in the video before items on the menu are selected via user interaction. Accordingly, if the previously displayed video is the same as the currently displayed video, the controller 160 can determine that the video being displayed is the video corresponding to the Internet information 155.

If it is determined that the previously displayed video is the same as the currently displayed video, the controller 160 can control the screen capturer 130 to capture the currently displayed video, and control the wireless transmitter/receiver 170 to transmit the captured video to the remote controller 200 in operation S430. This is because the video being displayed is the video corresponding to the Internet information 155 including the menus which enable the user to select the content. Upon transmitting the captured video to the remote controller 200 in operation S430, the user can easily select content using the menus.

The controller 160 can cause the screen capturer 130 to adjust a resolution of the captured video to be matched to a resolution of the remote controller 200. Additionally, the controller 160 can control information on a resolution of the Internet TV 100 to be contained in head information and transmit the head information when transmitting the captured video to the remote controller 200.

Furthermore, the controller 160 can determine whether coordinate data is received from the remote controller 200 in operation S440.

If it is determined that the coordinate data is received, the controller 160 can click on a menu item at a position corresponding to the received coordinate data on the website being displayed, and perform an operation indicated by the clicked menu item in operation S450. Specifically, the controller 160 can analyze the received coordinate data, grasp the position corresponding to the coordinate data, and select a corresponding menu item.

Figure 5:
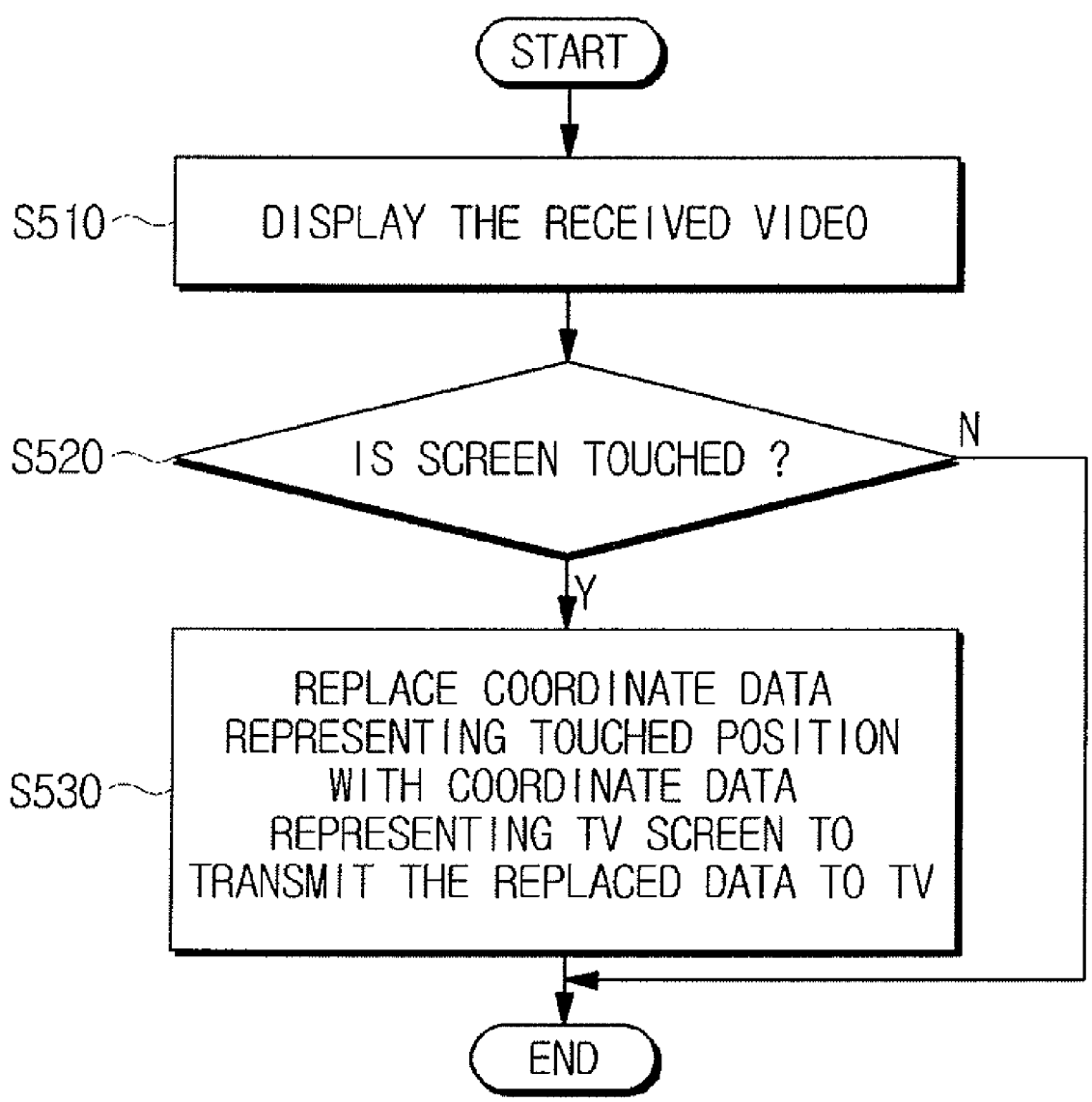
FIG. 5 is a flowchart regarding a method of searching the Internet using a remote controller included in the Internet TV according to an exemplary embodiment of the present general inventive concept.

FIG. 5 is a flowchart illustrating a method of searching the Internet using the remote controller included in the Internet TV 100 according to an exemplary embodiment of the present general inventive concept.

Corresponding to FIG. 5, the controlling part 220 can display via the LCD 230 the captured video received from the Internet TV 100 in operation S510.

Additionally, the controlling part 220 can determine whether a screen is touched in operation S520. If the screen is touched, the controlling part 220 can replace coordinate data (LCD-touch Co.) representing the touched position on the LCD 230 with coordinate data (ITV Co.) representing the screen of the Internet TV 100, and transmit the replaced data to the Internet TV 100 through the remote control transmitter/receiver 210 in operation S530. Although the resolution of the Internet TV 100 is distinct from that of the remote controller 200, the conversion of the LCD-touch Co. to the ITV Co. accounts for the different resolutions in order to accurately transfer the touched position 300 from the LDC 230 onto the display part 140, which is reflected by the position 350.

Equation 1 is used in order to replace coordinate data (LCD-touch Co.) of the touched position 300 on the remote controller 200 with coordinate data (ITV Co.) representing the screen of the Internet TV 100.

$$ITV\ Co = LCD\text{-}touch\ Co.* I\text{-}Res./R\text{-}Res.* ITV\ Res./I\text{-}Res. = LCD\text{-}touch\ Co* ITV\ Res./R\text{-}Res. \quad [\text{Equation 1}]$$

The controlling part 220 can replace the coordinate data (LCD-touch Co.) with the coordinate data (ITV Co.), using the coordinate data (LCD-touch Co.), resolution (ITV-Res.) of the Internet TV 100 contained in the head information of the captured video received from the Internet TV 100, and resolution (R-Res.) of the remote controller 200, as illustrated in Equation 1.

For example, if ITV-Res. is 1366×768, R-Res. is 320×240, and LCD-touch Co. is (100, 100), a horizontal coordinate value on the Internet TV 100 can be 100*(1366/320)=426.8, which can be rounded off to 427. Additionally, a vertical coordinate value on the Internet TV 100 can be 100*(768/240)=320. In other words, if LCD-touch Co. is (100, 100), ITV Co. can be (427,320).

Accordingly, the video information captured from the video receiving apparatus is transmitted to an external apparatus, and the operation indicated by the menu of video corresponding to the coordinate data received from the external apparatus is performed. Therefore, non-Internet TV websites can be used without being redesigned to accommodate the Internet TV 100 even though the website is not specially designed for use with the Internet TV 100.

Video requiring user selections is exemplified as video corresponding to the Internet information 155, but the present general inventive concept is not limited thereto. In other words, other video requiring user selections, such as survey research, can be implemented even among video corresponding to the broadcast signal 115. The video receiving apparatus can capture video requiring user selections from among video corresponding to the Internet information 155 and video corresponding to the broadcast signal 115, and transmit the captured video to the remote controller 200.

In the exemplary embodiments described above, coordinate data in a remote controller is replaced, but this is merely exemplary. If the remote controller transmits coordinate data representing a touched position to a video receiving apparatus, the video receiving apparatus can replace the received coordinate data with the coordinate data corresponding to the screen of the video receiving apparatus.

As described above, according to the exemplary embodiments of the present general inventive concept, non-Internet TV websites can be used without being redesigned, even though the non-Internet TV website was not initially designed for use with the Internet TV 100. Additionally, only coordinate data is transmitted, and thus there is minimal use of bandwidth and/or power consumption due to a small amount of data to be transmitted.

Although a few embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. A method of searching the Internet, the method comprising:
    determining whether a currently-displayed video requires a user selection;
    when it is determined that the currently-displayed video requires a user selection, capturing with a main body the currently-displayed video and transmitting the captured video to a remote controller based on the determination, the capturing the currently-displayed video including:
    determining whether the currently-displayed video is Internet video by determining whether the currently-displayed video is the same as a previously-displayed video, and
    capturing the currently-displayed video when it is determined that the currently-displayed video is the same as the previously-displayed video;
    displaying the received video and transmitting coordinate data representing a position on a screen of the displayed video touched by a user to the main body by the remote controller; and
    performing an operation indicated by a menu at the position representing the received coordinate data in the video currently being displayed by the main body.

2. The method as claimed in claim 1, wherein the capturing comprises adjusting the captured video according to a resolution of the remote controller.

3. The method as claimed in claim 1, wherein the transmitting the coordinate data comprises replacing the coordinate data representing the touched position with coordinate data representing a screen of the main body.

4. The method as claimed in claim 3, wherein the transmitting the coordinate data comprises computing the coordinate data representing the screen of the main body using the coordinate data representing the touched position main body resolution information contained in head information of the captured video to be transmitted to the remote controller and the resolution of the remote controller.

5. A video receiving apparatus comprising:
    a main body to capture currently-displayed video, to transmit the captured currently-displayed video, and to perform an operation indicated by a menu at a position representing received coordinate data in the currently-displayed video;
    a display part; and
    a remote controller to display the captured currently-displayed video received from the main body on the display part, and to transmit coordinate data representing a position on a screen of the displayed video touched by a user to the main body,
    wherein the main body comprises:
    a screen capturer to capture the currently-displayed video, the capturing including determining whether the currently-displayed video is Internet video by determining whether the currently-displayed video is the same as a previously-displayed video and capturing the currently-displayed video when it is determined that the currently-displayed video is the same as the previously-displayed video; and a controller to determine whether the currently-displayed video is video requiring a user selection, and to capture the currently-displayed video based on a determination that the currently-displayed video is video requiring a user selection.

6. The apparatus as claimed in claim 5, wherein the controller determines that the currently-displayed video is the video requiring the user selection if the currently-displayed video is the same as previously-displayed video.

7. The apparatus as claimed in claim 6, wherein the screen capturer adjusts the currently-displayed video according to a resolution of the remote controller.

8. The apparatus as claimed in claim 5, wherein the remote controller comprises:

a controlling part to replace the coordinate data representing the touched position with coordinate data representing a screen of the main body.

9. The apparatus as claimed in claim 8, wherein the controlling part computes the coordinate data representing the screen of the main body using the coordinate data representing the touched position, a main body resolution information contained in head information of the captured video to be transmitted to the remote controller, and a resolution of the remote controller.

10. A video receiving apparatus which receives a broadcast signal and Internet information to display video corresponding to the received broadcast signal and Internet information, the apparatus comprising:

a screen capturer to capture currently-displayed video, the capturing including determining whether the currently-displayed video is Internet video by determining whether the currently-displayed video is the same as a previously-displayed video and capturing the currently-displayed video when it is determined that the currently-displayed video is the same as the previously-displayed video; and a controller to determine whether the currently-displayed video is video requiring a user selection, to control the screen capturer so that the currently-displayed video is captured when it is determined that the currently-displayed video is video requiring a user selection, to transmit the captured currently-displayed video to a remote controller, and to perform an operation indicated by a menu at a position representing coordinate data received from the remote controller in the currently-displayed video.

11. A display apparatus comprising:

a primary display unit to display and transmit a video;

a secondary display unit to receive and display the video;

a user interface to enable a user to select a first point on the video displayed by the secondary display unit, a secondary display controller to transmit the first point to the primary display unit; and a primary display controller to receive the first point from the secondary display controller and to display a second point corresponding to the first point on the primary display unit, wherein the primary display controller determines whether the video displayed on the primary display unit requires a user selection, and to automatically transmit the video to the secondary display unit when the video requires the user selection, wherein the determination whether the video requires a user selection is performed by comparing the video to a previously-displayed video to determine whether the video is Internet video, wherein when the video is the same as the previously-displayed video, the primary display controller transmits the video to the secondary display unit.

12. The display apparatus of claim 11, further comprising:

a first set of x and y coordinates to define the first point; and a second set of x and y coordinates to define the second point, wherein the first set of x and y coordinates and the second set of x and y coordinates are equal.

13. The display apparatus of claim 11, wherein the primary display unit is larger than the secondary display unit.

14. The display apparatus of claim 11, wherein the secondary display unit is sized to be held via a user hand and simultaneously operated via a user thumb.

15. The display apparatus of claim 11, wherein when the video is different than the, previously-displayed video, the primary display controller does not transmit the video to the secondary display unit.

16. The display apparatus of claim 11, wherein the primary display unit is a color display unit and the secondary display unit is a color display unit.

* * * * *